(12) United States Patent
Stabenow (10) Patent No.: US 11,067,075 B2
(45) Date of Patent: Jul. 20, 2021

(54) METHOD FOR OPERATING A PRESSURE CONTROL SYSTEM COMPRISING A MULTI-STAGE COMPRESSOR, AND PRESSURE CONTROL SYSTEM

(71) Applicant: WABCO GmbH, Hannover (DE)

(72) Inventor: Uwe Stabenow, Laatzen (DE)

(73) Assignee: ZF CV SYSTEMS EUROPE BV, Brussels (BE)

(*) Notice: Subject to any disclaimer, the term of this patent is extended or adjusted under 35 U.S.C. 154(b) by 98 days.

(21) Appl. No.: 16/605,221

(22) PCT Filed: Apr. 12, 2018

(86) PCT No.: PCT/EP2018/059438
§ 371 (c)(1),
(2) Date: Oct. 15, 2019

(87) PCT Pub. No.: WO2018/202401
PCT Pub. Date: Nov. 8, 2018

(65) Prior Publication Data
US 2020/0124042 A1   Apr. 23, 2020

(30) Foreign Application Priority Data

May 5, 2017  (DE) ...................... 10 2017 004 360.4

(51) Int. Cl.
*F04B 49/08*   (2006.01)
*B60G 17/015*   (2006.01)
(Continued)

(52) U.S. Cl.
CPC .......... *F04B 49/08* (2013.01); *B60G 17/0155* (2013.01); *F04B 25/00* (2013.01);
(Continued)

(58) Field of Classification Search
CPC .......... F04B 25/00; F04B 49/03; F04B 49/08; F04B 49/225; B60G 17/0155;
(Continued)

(56) References Cited

U.S. PATENT DOCUMENTS 7,881,840 B2 * 2/2011 Rehra ................. B60G 17/052
701/37
9,938,981 B2 * 4/2018 Hein ................. B60G 17/0528
(Continued)

FOREIGN PATENT DOCUMENTS

DE         10321771 A1    12/2004
DE    102008023594 A1    11/2009
(Continued)

*Primary Examiner* — Patrick Hamo
(74) *Attorney, Agent, or Firm* — Leydig, Voit & Mayer, Ltd.

(57) ABSTRACT

A method for operating a pressure control system having a multistage compressor includes providing, by the multistage compressor, a pressure medium that has been compressed multiple times in order to fill a pressure medium reservoir or pressure medium chambers of the pressure control system. The providing the pressure medium involves providing, by a first compression stage, a precompressed pressure medium and additionally compressing, via a second compression stage, the precompressed pressure medium, and/or introducing an already compressed charge pressure medium into an intermediate volume between the first compression stage and the second compression stage of the multistage compressor and further compressing, by the second compression stage, the charge pressure medium. The charge pressure medium simultaneously passes, via a control line, to a control input of a shut-off valve that interacts with the first compression stage, such that a charge pressure of the charge pressure medium predefines a control pressure.

20 Claims, 5 Drawing Sheets (51) Int. Cl.
*F04B 49/22* (2006.01)
*F04B 25/00* (2006.01)
*F04B 49/03* (2006.01)
*B60G 17/052* (2006.01)

(52) U.S. Cl.
CPC ............ *F04B 49/03* (2013.01); *F04B 49/225* (2013.01); *B60G 17/0528* (2013.01); *B60G 2202/152* (2013.01); *B60G 2500/204* (2013.01); *B60G 2500/205* (2013.01); *F04B 2205/05* (2013.01)

(58) Field of Classification Search
CPC .......... B60G 17/0528; B60G 2202/152; B60G 2500/204; B60G 2500/205
See application file for complete search history.

(56) References Cited

U.S. PATENT DOCUMENTS

| | | |
|---|---|---|
| 2004/0228737 A1 | 11/2004 | Folchert |
| 2013/0255240 A1* | 10/2013 | Bergemann ............ F15B 21/048 60/327 |
| 2013/0320645 A1 | 12/2013 | Gall |
| 2014/0059876 A1 | 3/2014 | Folchert et al. |
| 2014/0241859 A1 | 8/2014 | Hein |
| 2017/0268498 A1* | 9/2017 | Kasahara ................ F04B 49/22 |

FOREIGN PATENT DOCUMENTS

| | | |
|---|---|---|
| DE | 102011084666 A1 | 8/2012 |
| DE | 102011083614 A1 | 9/2012 |
| DE | 102011084921 A1 | 4/2013 |
| DE | 102012005303 A1 | 6/2013 |
| DE | 102012006382 A1 | 10/2013 |
| DE | 102012010390 A1 | 12/2013 |
| DE | 102008034240 B4 | 12/2014 |
| DE | 102014012646 A1 | 2/2016 |

* cited by examiner

METHOD FOR OPERATING A PRESSURE CONTROL SYSTEM COMPRISING A MULTI-STAGE COMPRESSOR, AND PRESSURE CONTROL SYSTEM

CROSS REFERENCE TO RELATED APPLICATIONS

This application is a U.S. National Phase Application under 35 U.S.C. § 371 of International Application No. PCT/EP2018/059438, filed on Apr. 12, 2018, and claims benefit to German Patent Application No. DE 10 2017 004 360.4, filed on May 5, 2017. The International Application was published in German on Nov. 8, 2018 as WO 2018/202401 under PCT Article 21(2).

FIELD

The invention concerns a method for operating a pressure control system with a multistage compressor, in particular in a truck, and a pressure control system with a multistage compressor.

BACKGROUND

Multistage compressors are used to achieve a high compression of a pressure medium, in particular a gas, for example air, in that the pressure medium precompressed in a first compression stage is additionally compressed in a successive second compression stage. Further compression stages may also be provided in a cascade, in which in each case the pressure medium compressed by the preceding compression stage is further compressed.

If consumers, for example a pneumatic suspension system or ride height control system in a vehicle, are to be supplied with pressure medium, such a multistage compressor may be used to provide the pressure medium with a corresponding pressure for supplying compression springs. The multistage compressor here compresses the pressure medium introduced into an intake space from the atmosphere via two or more compression stages, and delivers the pressure medium, compressed in multiple stages, to the compression springs. Alternatively, an already compressed pressure medium from a pressure medium reservoir may be used, which is then compressed a further time by the compressor.

This is described for example in DE 10 2008 034 240 B4, according to which a ride height control system is provided in which a multistage compressor is used to convey the pressure medium from atmosphere or from a pressure medium reservoir, wherein two compression stages are provided. If pressure medium from atmosphere is compressed, the pressure medium is conducted through both compression stages, whereas when conveying pressure medium from the pressure medium reservoir, the pressure medium supplied to the consumer is compressed solely by the second compression stage. In order in this case to reduce or block the compression work of the first compression stage, a shut-off valve is provided which is configured as a 2/2-way directional control valve which, on delivery from the pressure medium reservoir, prevents delivery of compressed pressure medium from the first compression stage to the second compression stage. The shut-off valve is here actuated electrically via a control device.

DE 103 21 771 A1 describes a multistage compressor in which, to disable the first compression stage, a bypass line with a pneumatically controllable shut-off valve is provided, which connects an intake space of the compressor to the first compression space. The pneumatic shut-off valve is here opened depending on the pressure in the intake space, so that a pressure balance between the intake space and the compression space can take place. This serves to disable the first compression stage depending on the pressure of the pressure medium introduced into the intake space. In this way, depending on the introduced pressure medium, in single-stage operation a high compression can be achieved with a low volume flow. In two-stage operation however, a high volume flow is achieved and the pressure medium flows through two compression stages.

According to DE 10 2011 083 614 A1, it is proposed to compress air in two compression stages in an open operating mode and supply the compressed air to a pressure medium reservoir. In a closed operating mode, the already compressed air is transferred from the pressure medium reservoir to an intermediate volume between the first and second compression stages, and compressed again by one of the compression stages in order to then be conveyed to the consumers. Furthermore, a return of air from the consumers to the pressure medium reservoir is provided. Electrically actuated changeover valves are provided for control, which accordingly block and release the flow path for the compressed air or the air to be compressed.

DE 10 2012 010 390 A1 describes a ride height control system in which, in a closed operating mode, air already compressed by a compressor is supplied from the pressure storage container into consumers configured as spring struts. To control the pressure in the ride height control system, a pressure-limiting function is provided either in the form of an outlet valve or in the form of a pre-control valve, each of which release air to the atmosphere when the pressure in the system is too high.

SUMMARY

In an embodiment, the present invention provides a method for operating a pressure control system having a multistage compressor. The method includes providing, by the multistage compressor, a pressure medium that has been compressed multiple times in order to fill a pressure medium reservoir or pressure medium chambers of the pressure control system. The providing the pressure medium involves providing, by a first compression stage, a precompressed pressure medium and additionally compressing, via a second compression stage, the precompressed pressure medium, and/or introducing an already compressed charge pressure medium into an intermediate volume between the first compression stage and the second compression stage of the multistage compressor and further compressing, by the second compression stage, the charge pressure medium. The charge pressure medium simultaneously passes, via a control line, to a control input of a shut-off valve that interacts with the first compression stage, such that a charge pressure of the charge pressure medium predefines a control pressure of the shut-off valve. By the shut-off valve, a pressure limitation and/or volume flow limitation, dependent on the control pressure, of the precompressed pressure medium conveyed by the first compression stage into the intermediate volume is set for the purposes of automatically adapting the compression power of the first compression stage by the charge pressure medium present in the control line.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The invention provides methods for operating a pressure control system with a multistage compressor which, in a simple and reliable fashion, matches a compression power and a compressed volume flow of the multistage compressor to the operating modes of the pressure control system. The invention further provides pressure control systems with a multistage compressor.

According to the invention, it is thus proposed that a compression power of a first compression stage of a multistage compressor, in particular in a closed operating mode of a pressure control system, in particular of a pneumatic suspension system in a vehicle, is reduced or restricted—in particular restricted to a minimum—by a pneumatically controlled shut-off valve in dependence on a control pressure prevailing in a control line. According to the invention, the compression power is reduced or restricted by the shut-off valve controlling a limitation of the pressure and/or of the volume flow of a precompressed pressure medium conveyed through the first compression stage, the shut-off valve preventing—preferably entirely—a supply of pressure medium that is to be compressed, in particular intake air from an atmosphere or pressure medium from an upstream compression stage, into the first compression stage.

Pressure limitation is understood here as meaning that the atmospheric pressure or the pressure of the pressure medium from the upstream compression stage is reduced to a limit pressure and this limit pressure is thus not exceeded to achieve the adaptation of the compression power according to the invention.

In the case of maximum restriction of the pressure limitation to 0 bar absolute, or a throughflow rate of zero from the first compression stage, that is to say if the first compression stage is supplied with no more pressure medium to be compressed and thus also no longer conveys any precompressed pressure medium, the first compression stage is pneumatically completely shut down; thus, the first compression stage no longer contributes to an overall compression power of the multistage compressor, in particular in the closed operating mode, so that the portion of the first compression stage in the energy consumption of the multistage compressor is minimized to only friction losses and the compression of the pressure medium remaining in the first compression stage after closing of the shut-off valve.

In this way, the advantage can already be achieved that the compression power of the first compression stage can be adapted, simply and reliably in self-regulating or automatic fashion, in particular on changeover to the closed operating mode of the pressure control system, which is operated by the multistage compressor. Since the shut-off valve is actuated pneumatically, no further electronics effecting the changeover are necessary.

The first compression stage is not necessarily the compression stage lying at the start in the flow direction in the multistage compressor. Rather, this means that the first compression stage may be any compression stage in the multistage compressor which is followed by at least one further compression stage—a second compression stage—wherein this does not necessarily adjoin the first compression stage in the sense of the invention. The second compression stage is thus defined by the fact that it lies somewhere behind the first compression stage in the flow direction, wherein the second compression stage should not necessarily be regarded as the last compression stage of the multistage compressor.

In an open operating mode of the pressure control system, the multistage compressor provides pressure medium, for example intake air provided via an intake line from the atmosphere, precompressed by the first compression stage for example to an intermediate pressure of 5-6 bar, at a stabilization pressure of the first compression stage of for example 10-15 bar, and introduces this into an intermediate volume. From there, the precompressed air enters a second compression stage in which it is further compressed, for example to a final pressure of 20 bar, and from which it passes via an air dryer into one or more consumers, for example air springs of the pressure control system, and/or into a pressure medium reservoir. Thus the total compression power in the open operating mode is determined by both compression stages.

The closed operating mode is set in particular if the consumers of the pressure control system are to be supplied with highly compressed and/or dried pressure medium. This is the case in particular if rapid pressurization of the consumers is desired, for example if rapid adjustment by the pneumatic suspension control system is necessary by provision of a high final volume flow, i.e. a high quantity of air per time from the second or last compression stage. Also, the closed operating mode may be set if pressure medium is to be returned from the consumers to the pressure medium reservoir, since renewed compression must then also be guaranteed.

To switch from open operating mode to closed operating mode, for example a changeover valve connecting the pressure medium reservoir or consumers to the storage line is opened, so that already compressed pressure medium, referred to below as charge pressure medium, can flow into the storage line. The charge pressure medium may firstly be the pressure medium stored in the pressure medium reservoir, which has already been compressed to a reservoir pressure. If however, in closed operating mode, the already compressed pressure medium is to be returned from the consumers to the pressure medium reservoir, the pressure medium from the consumers is the charge pressure medium which is introduced into the storage line. For this, two separate changeover valves may be provided for the consumers and the pressure medium reservoir for controlling the inflow into the storage line.

According to the invention, the charge pressure medium can enter the intermediate volume between the first and second compression stages via the storage line and simultaneously for example via a control line, which branches off from the storage line, to a control input of the pneumatically controlled shut-off valve. In both the intermediate volume and the control input, approximately the same pressure prevails which is slightly lower than the reservoir pressure in the pressure medium reservoir or the pressure in the consumers, since the pressures diminish on flowing through the changeover valve and storage line. In closed operating mode therefore, the already highly compressed charge pressure medium may be additionally compressed by the second compression stage.

A storage volume flow of the already compressed charge pressure medium introduced into the storage line, i.e. an air quantity per time introduced into the intermediate volume, is here in particular dependent on a nominal width of the changeover valve and in some cases further upstream valves through which the charge pressure medium flows. The storage volume flow in turn also determines the final volume flow of the pressure medium conveyed by the second compression stage. Both volume flows may be designed higher due to the energy saving in the first compression stage:

Because the compression power and hence also the energy consumption of a motor of the multistage compressor of the first compression stage can be reduced in the closed operating mode, this energy transfer may be used additionally to operate the second compression stage up to an acceptable maximum energy limit, in particular a current limit of for example 35 A. For example, the nominal width of the changeover valve and hence the storage volume flow may be designed higher without exceeding the acceptable maximum energy limit. Consequently, an effective power of the pressure control system is increased, since for the same acceptable electrical power, a significantly higher final volume flow through the second compression stage can be guaranteed for the same energy input.

As soon as, in closed operating mode, the charge pressure medium is introduced into the intermediate volume, the first compression stage provides a precompressed pressure medium which is compressed up to the charge pressure of the charge pressure medium prevailing in the intermediate volume. According to the invention, this can be automatically prevented by releasing the charge pressure medium since the shut-off valve is also actuated via the control line. Depending on the control pressure, the latter then immediately changes over and reduces or shuts down the compression power of the first compression stage. In the preferred case, the compression power of the first compression stage is completely shut down, that is to say the compression power of the first compression stage is restricted to the value zero.

If the compression power of the first compression stage in the closed operating mode does not completely shut down but rather only reduces, there is in the intermediate volume a mixture of pressure medium, which has been precompressed by the first compression stage, and the respective charge pressure medium from the storage line. In this way, in that case a mixed pressure medium with a mixed volume flow and a mixed pressure, composed of the respective volume flows and pressures, is conveyed from the intermediate volume to the second compression stage.

When setting the closed operating mode, the shut-off valve is preferably completely closed in dependence on the control pressure, the shut-off valve being arranged in the intake line so that closing of the shut-off valve prevents the intake air from being able to flow into the first compression stage. Thus, there is preferably no precompressable pressure medium available to the first compression stage. If, in the closed operating mode, the shut-off valve is not completely switched to the closed position, only a small portion of the intake air is allowed into the first compression stage for precompression.

According to the invention, this can have the effect that, in the closed operating mode, no or only a small portion of the pressure medium is conveyed from the first compression stage into the intermediate volume. In the open operating mode, by contrast, no control pressure acts on the shut-off valve and so the shut-off valve remains open and all of the intake air is conveyed into the first compression stage and, precompressed, into the intermediate volume. Advantageously, a cross section of the shut-off valve is here chosen so as to be comparable to a line cross section of the intake line, so that in the open state of the shut-off valve, that is to say in the open operating mode, the operation of the pressure control system is not influenced by the additional shut-off valve.

The complete or partial separation of the intake line from the first compression stage, controlled by the shut-off valve, ensures that, in contrast to the open operating mode, no or only a small portion of the intake air is precompressed by the first compression stage and conveyed into the intermediate volume. As a consequence, the first compression stage no longer contributes, or contributes only slightly, to the overall compression power of the compressor.

In closed operating mode, the majority of the total compression power is thus achieved by compression of the charge pressure medium introduced from the storage line into the intermediate volume and not conveyed by the first compression stage. An inflow of charge pressure medium from the intermediate volume into the first compression stage is prevented by a first outlet valve in the first compression stage, for example a check valve opening towards the intermediate volume. Thus no pressure balance takes place between the intermediate volume and the first compression space of the first compression stage.

Advantageously, this automatically restricts the compression power of the first compression stage in the closed operating mode since the first compression stage does not compress the pressure medium to the intermediate pressure, prevailing in the intermediate volume, of the charge pressure medium. This makes it possible to limit the power consumption of the first compression stage, this power consumption being essentially restricted, in the event of complete shutdown of the first compression stage, to the friction losses and the compression of the pressure medium remaining in the intake line after closing of the shut-off valve. The drive power of a motor of the compressor is thereby reduced, the energy consumption falls and can therefore, in the closed operating mode, be matched primarily to the operation of the second or further compression stages and hence to the final volume flow. Furthermore, a pressure medium which has reached a high drying stage may be supplied to the consumers or the pressure medium reservoir, since the proportion of undried pressure medium, which is conveyed substantially from the first compression stage and hence from the atmosphere, is reduced.

By virtue of the fact that the actuation, according to the invention, of the shut-off valve can be effected pneumatically and hence can be directly coupled to the release of the charge pressure medium from the pressure medium reservoir or from the consumers into the intermediate volume, switching takes place without additional effort and time losses. Since the charge pressure medium is not supplied to the multistage compressor by the first compression stage, a simple design and operation of the pressure control system can be achieved, since the uncompressed pressure medium in open operating mode and the charge pressure medium in closed operating mode are introduced into the multistage compressor at different locations, and hence no switching of the pressure medium source from the first compression stage is required.

In order to avoid undesired closing of the shut-off valve in the open operating mode, it is provided, according to a first embodiment, to adapt a closing pressure of the shut-off valve above the maximum required compression pressure of the first compression stage and thus to a maximum intermediate pressure that is to be achieved by the first compression stage taking into account a minimum possible charge pressure of the charge pressure medium. The corresponding setting of the closing pressure thus forms a shut-off function for the open operating mode, which prevents switching of the shut-off valve by the pressure medium precompressed by the first compression stage. The pressure control system, or the multistage compressor, is in that case to be appropriately adapted to the closing pressure so that the latter is not reached by the first compression stage in the open operating mode. If, for example, the maximum permissible final pressure of the pressure control system is 20 bar, a maximum intermediate pressure of approximately 4.5 bar is reached so that it is possible to set a closing pressure of the shut-off valve of for example 5 bar, which also approximately corresponds to the minimum charge pressure of the charge pressure medium.

In this case, in the open operating mode, the shut-off valve remains open at an intermediate pressure of 4.5 bar, and the multistage compressor conveys compressed pressure medium from the second compression stage at a final pressure of approximately 20 bar. In the closed operating mode, the intermediate pressure rises, and therefore so does the control pressure at the shut-off valve, to above 5 bar, the shut-off valve closes, the compression power of the first compression stage is reduced and, owing to the renewed compression of the charge pressure medium, the second compression stage can reach a high final pressure which can be supplied to the consumers or to the pressure medium reservoir. This makes it simple to achieve an undesired closing of the shut-off valve in the open operating mode without additional components, merely by appropriate adaptation of parameters of the pressure control system.

According to one alternative embodiment, to form the shut-off function there is provided, between the control line and the intermediate volume, an additional valve which can for example take the form of an overpressure valve, in particular a check valve, or a pneumatic control valve. The additional valve shuts off the passage, from the intermediate volume toward the shut-off valve, of pressure medium precompressed the first compression stage. This makes it simple to avoid an alternative shut-off action of the first compression stage in the open operating mode, wherein by virtue of the provision of an additional valve the first compression stage can also convey pressure medium at an intermediate pressure higher than the closing pressure of the shut-off valve. Thus, adaptation of the parameters of the pressure control system is not necessarily required.

The shut-off valve can be designed as a pneumatically actuated 2/2-way directional control valve with a spring, wherein the spring switches the directional control valve into its open position as soon as the control pressure drops below a closing pressure of for example 5 bar. If, for example, an overpressure valve is provided as additional valve in order to avoid, in the open operating mode, unintended closing of the shut-off valve, the closing pressure can also be less than 5 bar since the control line is not pressurized except for in the closed operating mode. If the control pressure is greater than the closing pressure, the shut-off valve is partially or completely closed. In its closed position, the shut-off valve prevents an inflow of intake air through the intake line towards the first compression stage. In its partially closed position, depending on a valve cross section of the shut-off valve, only a portion of the intake air is guided to the first compression stage.

Advantageously, with such a pneumatic shut-off valve, a simple and economic design can be achieved with which the efficiency of the compressor can be set optimally, i.e. a high storage volume flow by enlarging the nominal width, in particular of the changeover valve, at a maximal energy consumption which can be set simultaneously, and a dried pressure medium. Without this configuration, the energy in the system would be raised and additionally an incalculable drying level of the system would result. If only the purely closed operation is achieved by complete shutdown of the first compression stage, there results a definite physical control in relation to drying level and energy consumption and also energy preservation of the system. According to an alternative embodiment, it is also possible to use a pneumatically controlled proportional valve as the shut-off valve. This closes according to the magnitude of the prevailing control pressure, continuously or stepwise starting from the closing pressure, so that the compression power of the first compression stage can be coordinated variably. Thus, in an intermediate position of the shut-off valve that is dependent on the control pressure, only a portion of the intake air is guided to the first compression stage, the portion being dependent on the prevailing control pressure. This portion is supplied to the first compression stage in which, precompressed, it reaches the intermediate volume.

It is thus possible to advantageously achieve a variable reduction in the compression power of the first compression stage, dependent on the charge pressure of the charge pressure medium. If, for example, a charge pressure medium has a high charge pressure, that is to say high compression, the compression power of the first compression stage in the closed operating mode can be reduced to a greater degree or even shut down, and at low charge pressure, a higher compression power can be set in an assisting manner by means of the first compression stage. In this way, in both cases, the overall compression power and the efficiency of the compressor can be optimally adapted to the actually prevailing conditions by virtue of the pressure limitation and/or the volume flow limitation being set correspondingly by means of the shut-off valve.

In particular, this may occur in a manner dependent on the predefined energy consumption, that is to say an upper energy limit. The pneumatic shut-off valve is then designed such that the first compression stage is used for compression until such time as a set upper energy limit for the compressor has been reached. If the upper current limit is exceeded, the shut-off valve automatically switches over, such that the power consumption of the first compression stage is reduced, and the current consumption lies within the limit values again. In this way, the final volume flow provided by the second compression stage and the overall compression power are, with simultaneous adherence to the energy specifications, optimally coordinated with one another in the closed operating mode. This coordination is possible both for a pneumatic directional control valve and for a proportional valve.

Optimal operation of the pressure control system is thus achieved for closed operating mode by an optimally designed second compression stage, which is filled by the maximal storage volume flow—defined in particular by the nominal width of the changeover valve—and the switchedoff or reduced first compression stage at the power limit of the multistage compressor or upper energy limit. In addition, for safety, an additional pressure relief valve may be provided in the storage line which establishes a maximum charge pressure in the storage line, wherein the maximum charge pressure may be selected depending on the maximum energy limit so that the second compression stage is not operated beyond its performance limit or the performance limit of its drive. In addition, the design of the second compression stage of the multistage compressor may be adapted, in that for example a piston ensuring compression in the second compression stage is designed larger.

Additionally, as a shut-off valve, a 3/2-way directional control valve or 3/2 proportional valve may be provided, such that purging of the storage line is advantageously also possible in the open operating mode.

According to the invention, the multistage compressor can be configured as a piston compressor, wherein a first piston forms a first compression stage and a second piston forms the second compression stage; said stages are connected together by the intermediate volume, wherein further compression stages with further pistons may be present. All pistons are moved by a motor via a piston drive in order to successively compress the pressure medium in the corresponding compression space. The compression stages have different compression volumes in order to be able to achieve a precompression by the first compression stage and an additional compression by the second compression stage, and in some cases a further compression by further compression stages. The piston compressor is part of a pressure control system which supplies several springs with compressed air via the compression of air as pressure medium, in order for example to achieve springing or raising and lowering of part of the vehicle, wherein this may take place in a closed or open operating mode.

Advantageously, the shut-off valve and the associated transfer lines for the pneumatic and self-regulating adjustment of the compressor in closed operating mode may be integrated compactly in a compressor housing, for example a compressor cover. This saves space and weight, and also ensures simple construction with short pneumatic transfer routes. Also advantageously, it is easy to fit the additional pneumatic components into a conventional multistage compressor.

Figure 1A:
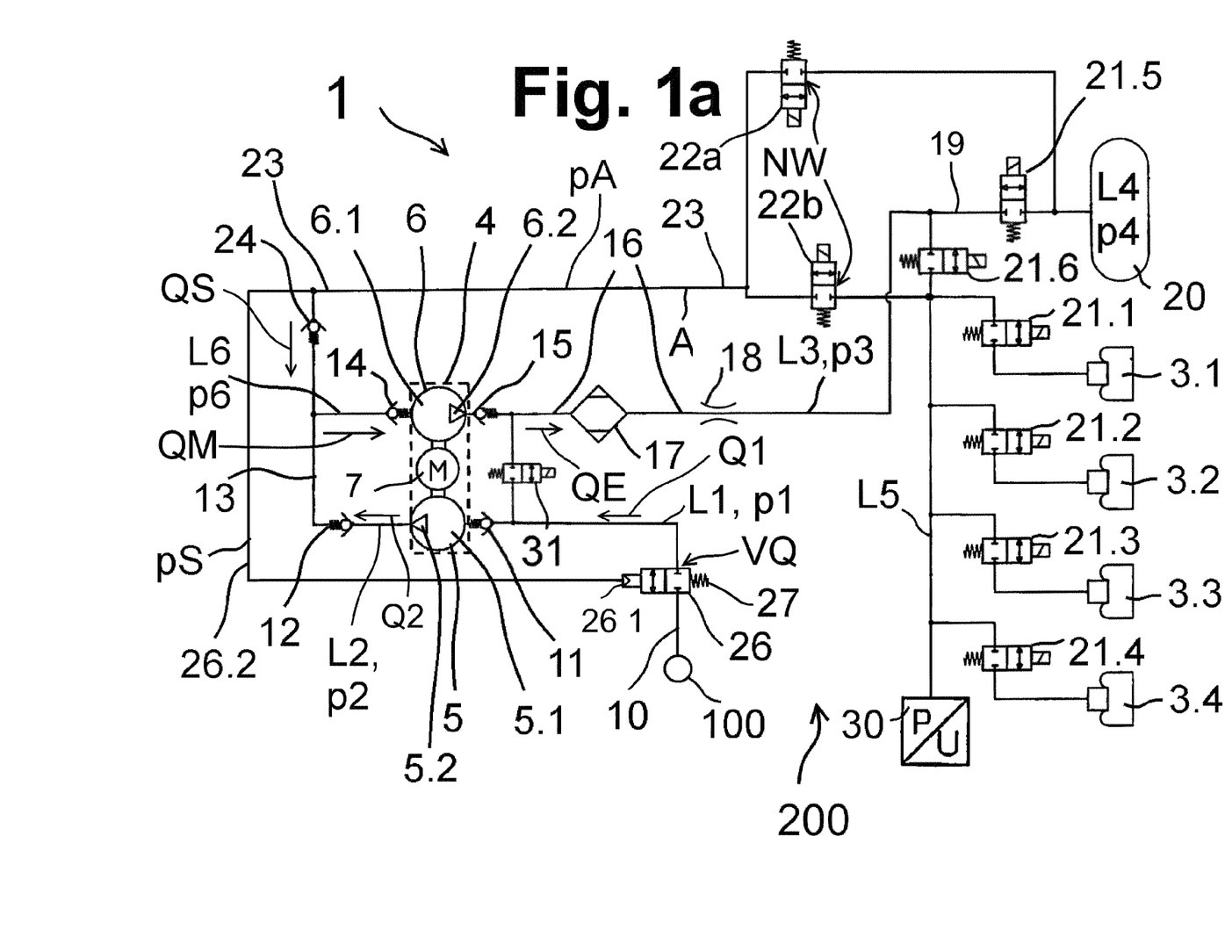
FIGS. 1a, b, and c illustrate different embodiments of a pneumatic suspension system with a two-stage compressor.

According to FIG. 1a, b, c, a pressure control system is provided in each case, for example a pneumatic suspension system 1, comprising four pressure medium chambers 3.1, 3.2, 3.3, 3.4 which are each assigned to a consumer, for example air springs of the vehicle 200. The pressure medium chambers 3.i are supplied with a compressed pressure medium L3, for example air, wherein the compressed pressure medium L3 is compressed in a two-stage compressor 4, for example a piston compressor shown in FIG. 2.

Figure 1B:
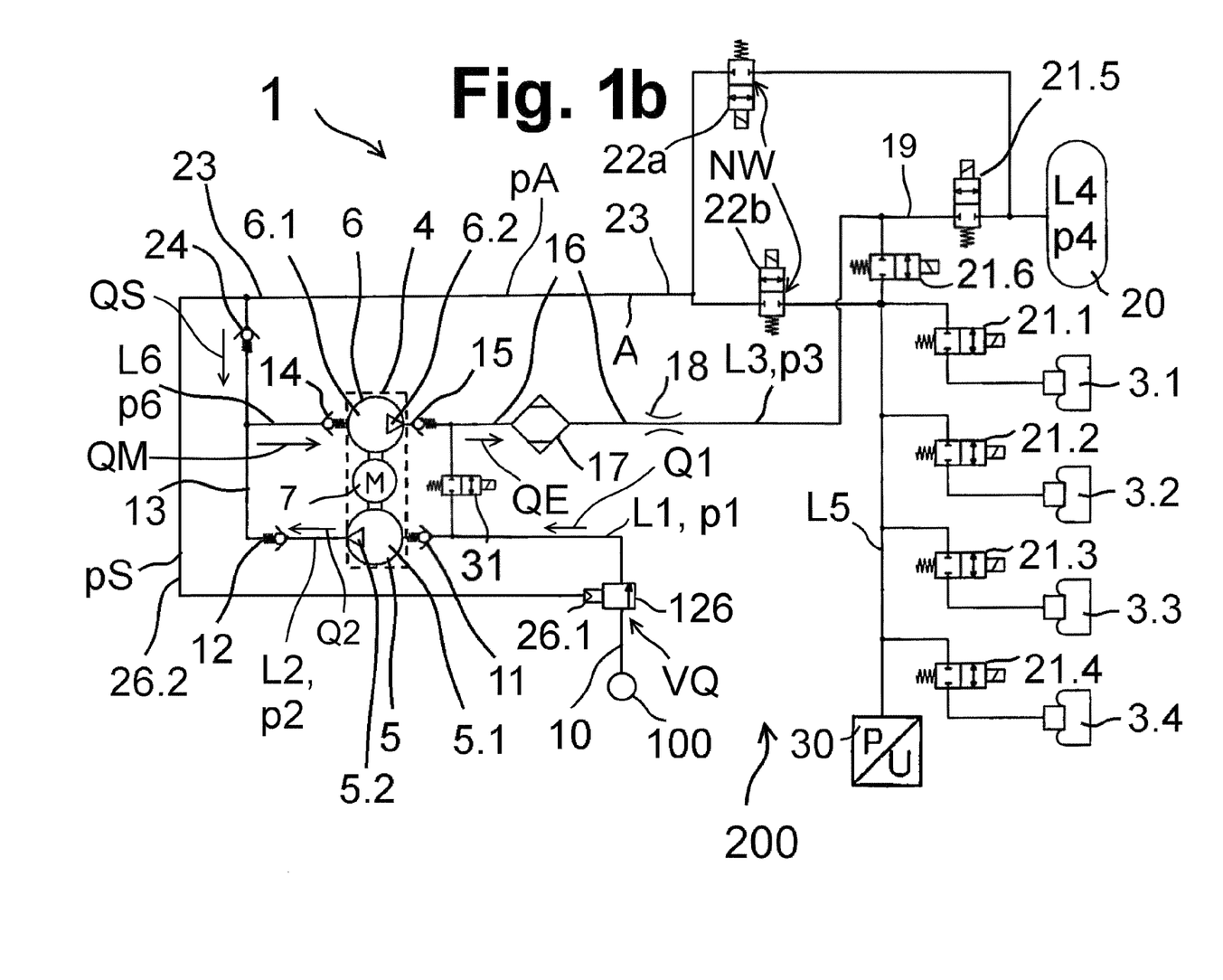
Figure 1C:
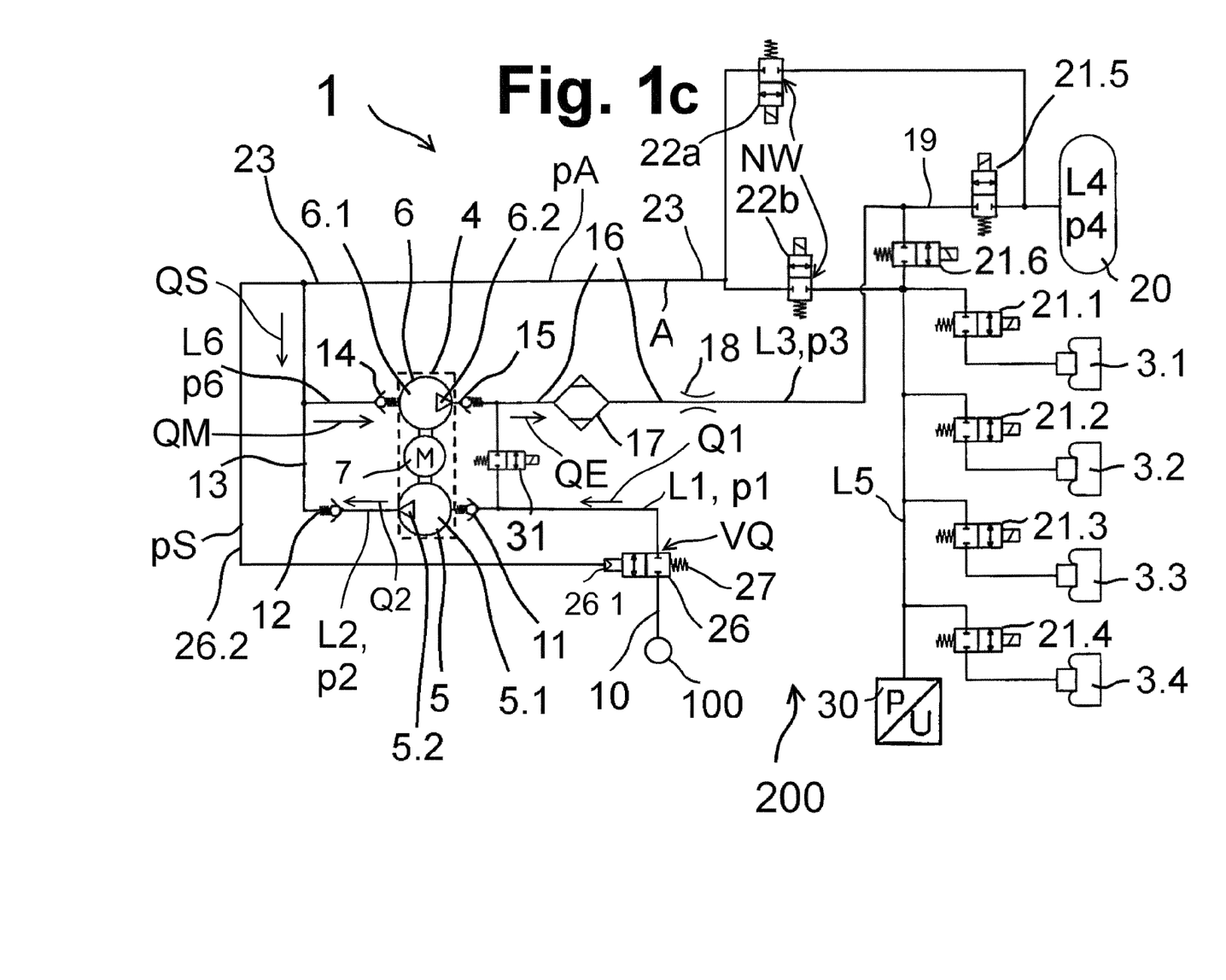

The two-stage compressor 4 has for this a first compression stage 5 and a second compression stage 6, each of which comprise an intake space 5.1, 6.1 and a compression space 5.2, 6.2, wherein pressure medium L1, L6 flowing into the respective intake space 5.2, 6.2 is compressed. The compression stages 5, 6 are driven by a motor 7, which causes a piston 8, 9 present in the respective compression stage 5, 6 to move up and down and thereby compress the pressure medium L1, L6 present in the intake chamber 5.1, 6.1 accordingly.

The pressure control system 1 in this embodiment may be operated in two operating modes, an open mode BMo and a closed mode BMc, in each of which air is conveyed and compressed as a pressure medium L1, L2, L3, L4, L5, L6.

In open mode BMo, intake air L1 is drawn from atmosphere 100, i.e. with an air pressure or intake pressure p1 of around 1 bar and an intake volume flow Q1, into the first intake space 5.1 of the first compression stage 5 via an intake line 10 and a first inlet valve 11. Then the intake air L1 is precompressed initially by the first piston 8 and conducted into the first compression space 5.2. From the first compression space 5.2, the precompressed air L2 with an intermediate pressure p2 and an intermediate volume flow Q2 flows into an intermediate volume 13 via a first outlet valve 12, for example a check valve.

From the intermediate volume 13, the precompressed air L2 passes via a second inlet valve 14 into the second intake space 6.1 of the second compression stage 6, from which the precompressed air L2 is compressed further via a second piston 9 (see FIG. 2) and introduced into the second compression space 6.2. From the second compression stage 6, the compressed air L3 with a final pressure p3 passes via a second outlet valve 15 into an outlet line 16 leading to an air dryer 17 and a nozzle 18. Then the outlet line 16 conducts the compressed air L3 to the pressure medium chambers 3.1, 3.2, 3.3, 3.4 of the connected consumers, for example the air springs, and via a reservoir line 19 to a pressure medium reservoir 20, in which the precompressed air L3 is stored as stored air L4 with a reservoir pressure p4, which is slightly lower than the final pressure p3 because of losses.

The pressure medium reservoir 20 and the pressure medium chambers 3.1, 3.2, 3.3, 3.4 can each be connected to the outlet line 16 or reservoir line 19 by a controllable valve 21.1, 21.2, 21.3, 21.4, 21.5, 21.6, for example a 2/2-way magnetic valve, so that depending on the position of the controllable valves 21.i, the compressed air L3 can flow into the pressure medium chambers 3.1, 3.2, 3.3, 3.4 in order to control the consumers, or into the pressure medium reservoir 20.

Accordingly when the sixth valve 21.6 is open and the first valve 21.1 is open, the compressed air L3 is conducted into the first pressure medium chamber 3.1; with the second valve 21.2 open, into the second pressure medium chamber 3.2; with the third valve 21.3 open, into the third pressure medium chamber 3.3; and with the fourth valve 21.4 open, into the fourth pressure medium chamber 3.4, wherein the fifth valve 21.5 is closed and hence no compressed air L3 can flow into the pressure medium reservoir 20.

If however valves 21.1, 21.2, 21.3, 21.4, 21.6 are in the closed position and the fifth valve 21.5 is open, compressed air L3, which has been dried in the air dryer 17, can be conducted into the pressure medium reservoir 20 where it is stored. Pressure monitoring may take place by a pressure meter 30. The compressed air L3 may be discharged into the atmosphere 100 via an additional outlet valve 31.

In closed operating mode BMc, the air L4 stored in the pressure medium reservoir 20 may be introduced into the intermediate volume 13 as charge pressure medium A, so that the already compressed air L4 is compressed a further time. For this, according to this embodiment, the fifth valve 21.5 is closed and a first changeover valve 22a, which is arranged in a storage line 23 branching off between the first valve 21.5 and the pressure medium reservoir 20, is opened. According to the embodiment in FIGS. 1a and 1b, the storage line 23 is connected via an additional valve 24, for example a shut-off valve, in particular a check valve, or a pneumatic directional control valve, to the intermediate volume 13, so that in the open position of the first changeover valve 22a, the stored air L4 can flow into the intermediate volume 13 and into the second intake space 6.1, in order to be compressed again by the second compression stage 6. The first outlet valve 12 prevents an inflow of stored air L4 into the first compression stage 5 since it closes in this direction.

If, in closed operating mode BMc, a return of chamber air L5 from the pressure medium chambers 3.*i* into the pressure medium reservoir 20 is desired, the valve 21.*i* (with i=1 . . . 4) assigned to the respective pressure medium chamber 3.*i*, and a second changeover valve 22*b*, are opened and the sixth valve 21.6 is closed, so that the chamber air L5 is introduced into the storage line 23 as charge pressure medium A. The first changeover valve 22*a* in this case is also closed, and the fifth valve 21.5 opened in order to allow a return to the pressure medium reservoir 20. If only compression of stored air L4 is provided in the pressure control system 1, the path via the second changeover valve 22*b* may also be omitted.

A nominal width NW of the changeover valves 22*a*, 22*b* is here selected for example between 1 mm and 4 mm, so that a high storage volume flow QS into the intermediate volume 13 may be set.

Since, in closed operating mode BMc, the first compression stage 5 is not necessarily required for precompression, as a (pre)compressed charge pressure medium A has already been introduced into the intermediate volume 13 via the storage line 23, according to the invention the compression power of the first compression stage 5 is restricted, in particular switched off, which means that no air L2, or less compared to the open operating mode BMo, precompressed by the first compression stage 5 is conveyed into the intermediate volume 13. That is to say, a pressure limitation and/or a volume flow limitation, of the precompressed pressure medium L2 conveyed into the intermediate volume 13, to a limit pressure pG or limit volume flow QG set by means of a shut-off valve 26 is achieved.

For this purpose, a shut-off valve 26 is arranged in the intake line 10, which valve has a pneumatic control input 26.1, which is connected to a control line 26.2, wherein, in this embodiment, the control line 26.2 branches off from the storage line 23, such that the charge pressure medium A is admitted into the control line 26.2, and thus a charge pressure pA of the charge pressure medium A prevailing in the control line 26.2 prevails at the control input 26.1. The shut-off valve 26 is switched in a manner dependent on a control pressure pS, which, in the case of an opened first switching valve 22*a* or second switching valve 22*b*, approximately corresponds to the charge pressure pA of the respective charge pressure medium A prevailing at the control input 26.1.

As soon as the respective changeover valve 22*a*, 22*b* is opened in order to activate the closed operating mode BMc and operate the pneumatic suspension system 1 with the stored air L4 or return the consumer air L5, the compression power of the first compression stage 5 is automatically restricted or switched off by the shut-off valve 26. For this purpose, the pneumatic control pressure pS prevailing at the control input 26.1 switches over the shut-off valve 26 such that the latter preferably completely closes, such that preferably no intake air L1 reaches the first compression stage 5 and therefore all that is compressed by the first compression stage 5 is the pressure medium remaining in the first compression stage 5 after switchover of the shut-off valve 26. In the closed operating mode, compression thus takes place primarily—in particular solely—via the second compression stage 6 in order to supply the pressure medium chambers 3.*i* with air or achieve a return to the pressure medium reservoir 20.

According to a first embodiment, the shut-off valve 26 is in the form of a pneumatic 2/2-way directional control valve with a spring 27. Accordingly, the pneumatic control valve shuts off the intake line 10 as soon as a set control pressure pS is exceeded, which fully closes the shut-off valve 26 counter to the force of the spring 27, as illustrated in FIGS. 1*a* to 1*c*. If the control pressure pS is too low, in particular lower than a closing pressure pO of the shut-off valve 26, the shut-off valve 26 opens completely, such that the intake air L1 can reach the first compression stage 5. In the force-free state (idle mode), that is to say without a prevailing control pressure pS, the spring preload 27 causes the shut-off valve 26 to adopt its open position.

Here, the closing pressure pO may be selected such that the additional valve 24, which in the open operating mode BMo prevents the shut-off valve 26 from closing already owing to the precompressed pressure medium L2, can be omitted, as shown in the embodiment in FIG. 1*c*. For this purpose, the closing pressure pO must be selected to be higher than a maximum attainable intermediate pressure p2*max* that is to be attained by means of the first compression stage 5. Furthermore, a minimum charge pressure pAmin of the charge pressure medium A must be taken into consideration, such that, in the open operating mode BMo, an unintended closing of the shut-off valve 26, and in the closed operating mode BMc, a guaranteed closing of the shut-off valve 26, and thus a power reduction, can be ensured. The entire pneumatic suspension system 1 or the multistage compressor 4 must in this case be correspondingly adapted to said closing pressure pO of the shut-off valve 26, such that, in particular, the minimum charge pressure pAmin and the maximum intermediate pressure p2*max* are set accordingly.

Thus, either by means of the closing pressure pO and/or by means of the additional valve 24, a shut-off function can be generated, which in each case prevent the pressure medium L2 precompressed by the first compression stage 5 from switching over the shut-off valve 26 in the open operating mode BMo.

If, for the first compression stage 5, in the closed operating mode BMc, only a reduction of the compression power to greater than zero is provided, that is to say the first compression stage 5 introduces a precompressed pressure medium L2 with an intermediate volume flow Q2 into the intermediate volume 13, a mixed pressure medium L6 is present in the intermediate volume 13, which contains proportionally the charge pressure medium A and the precompressed pressure medium L2. The mixed pressure medium L6 is conveyed into the second compression stage 6 with a mixed pressure p6 and a mixed volume flow QM, which are defined by the respective pressures pA, p2 and volume flows QS, Q2 of the charge pressure medium A and precompressed pressure medium L2.

If, however, the first compression stage 5 is completely shut down in the closed operating mode BMc, only the charge pressure medium A with the charge pressure pA and the storage volume flow QS is introduced from the intermediate volume 13 into the second compression stage 6. The mixed pressure medium L6 thus consists exclusively of the charge pressure medium A with the charge pressure pA without a portion of precompressed air L2 from the first compression stage 5.

In open operating mode BMo however, only the precompressed air L2 with the intermediate pressure p2 and the intermediate volume flow Q2 is conveyed into the second compression stage 6 through the intermediate volume 13, without being mixed with the charge pressure medium A. The mixed pressure medium L6 thus comprises solely the precompressed air L2 with the intermediate pressure p2 and the intermediate volume flow Q2.

Alternatively, the shut-off valve 26 as per FIG. 1*b* may also be formed as a 2/2 proportional valve 126 which, depending on the prevailing control pressure pS and valve cross section VQ at the pneumatic control input 26.1, discharges only a portion of the intake air L1 into the first compression stage 5—without additional valve 24 only when the closing pressure pO has been reached—and it is thus possible to variably set the degree to which the compression power of the first compression stage 5 is restricted in the closed operating mode BMc.

In this way, in closed operating mode BMc, a power limitation can be achieved by which the energy consumption of the compressor 4 can be variably adapted or minimized, since precompression of the intake air L1 to the charge pressure pA prevailing in this case in the intermediate volume 13 is prevented. The required power consumption of the motor 7 of the compressor 4 is thereby limited, since the first piston 8 has less compression work to perform. This may be utilized for optimizing the second compression stage 6, such that an optimum coordination in particular of a final volume flow QE of the second compression stage 6, of an upper energy limit of of the compressor 4 and of a piston diameter D2 of the second compression stage 6 is possible.

Figure 2:
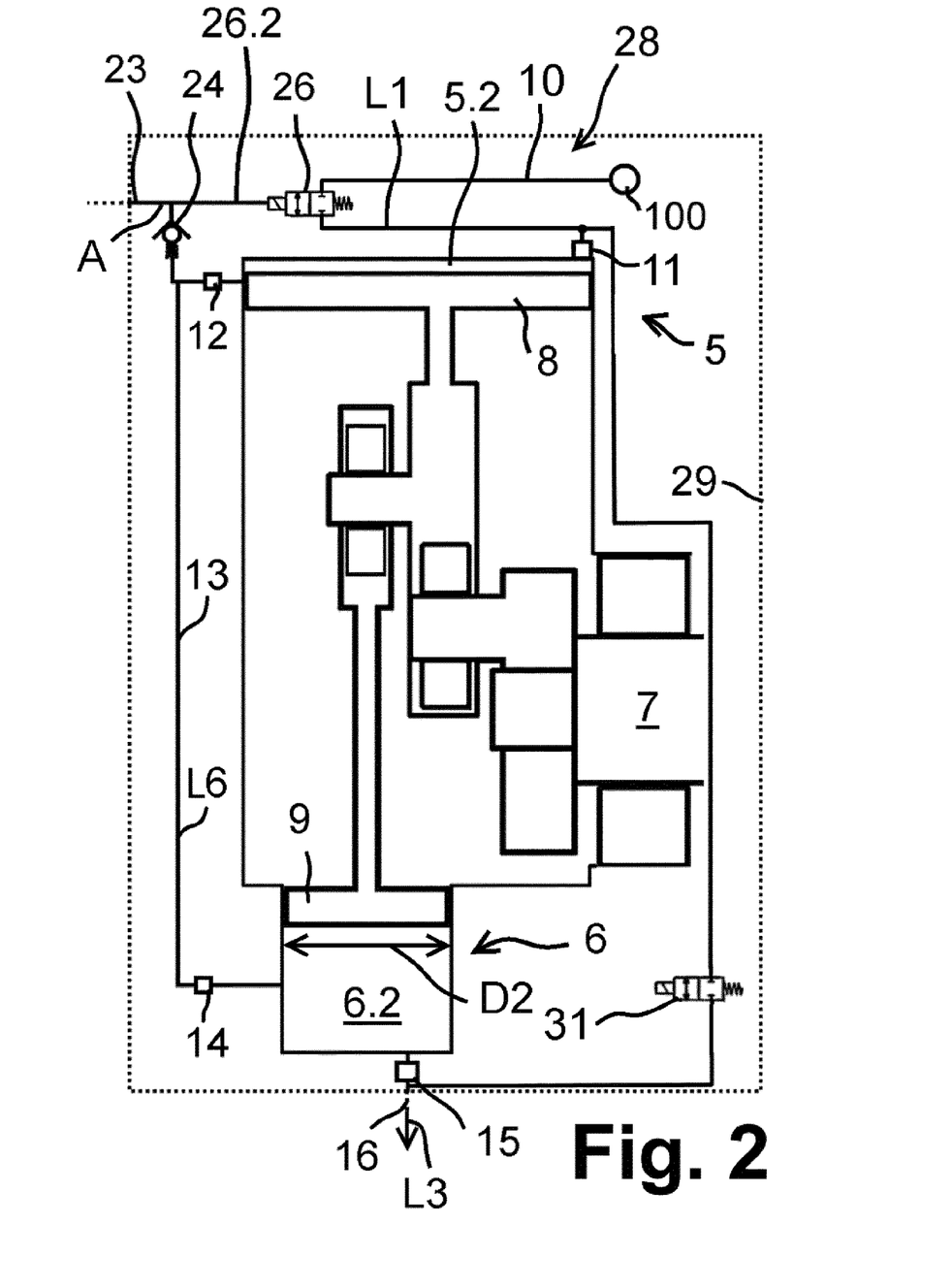
FIG. 2 illustrates a two-stage compressor with an integrated pressure-controlled shut-off valve in accordance with a first embodiment.

According to FIG. 2, the multistage piston compressor 4 is shown diagrammatically with the first and second compression stages 5, 6, which corresponds to the embodiment illustrated in FIG. 1*a* with an additional valve 24 and a pneumatic 2/2-way directional control valve as shut-off valve 26. The two compression stages 5, 6 are connected together by the intermediate volume 13 so that, in particular in operating mode BMo, the air L2, which has been precompressed in the first compression stage 5 by the first piston 8, can be conveyed into the second compression stage 6 in order to be compressed further there by the second piston 9.

In closed operating mode BMc, the charge pressure medium A is conducted into the intermediate volume 13 via the storage line 23 and via the control line 26.2 to the control input 26.1 of the shut-off valve 26. The pneumatic shut-off valve 26, the associated transmission lines 23, 26.2 and the additional valve 24 may be arranged compactly for example in the compressor cover 28 of the compressor housing 29.

Figure 3:
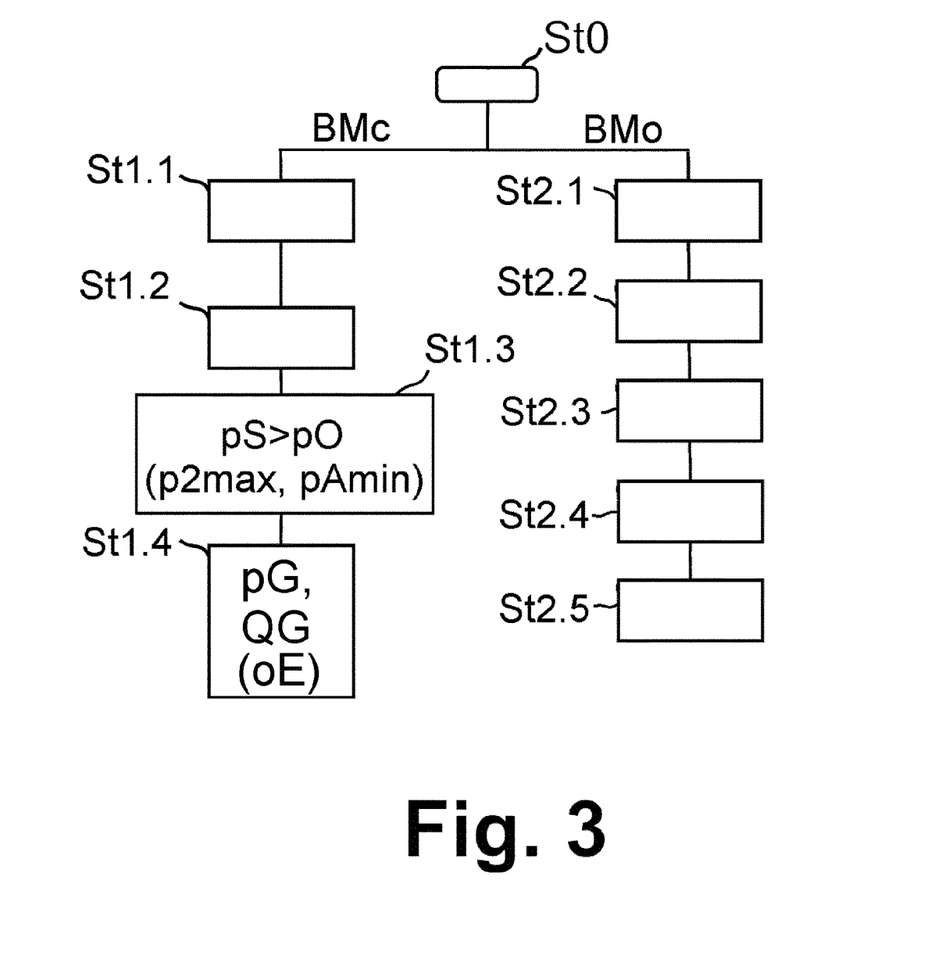
FIG. 3 illustrates a flow diagram for performance of a method according to an embodiment of the invention.

According to FIG. 3, the method according to the invention for operating the pneumatic suspension system in closed operating mode BMc may be carried out as follows:

In an initial step St0, it is checked which operating mode BMo, BMc of the pressure control system is set.

If the closed operating mode BMc of the pressure control system 1 is set, in a first step St1.1, the charge pressure medium A is released via the respective changeover valve 22*a*, 22*b* and introduced via the storage line 23 into the intermediate volume 13, from where it is compressed again by the second compression stage 6. Inflow into the first compression stage 5 is prevented by the outlet valve 12.

At the same time, in a second step St1.2, the charge pressure medium A passes via the control line 26.2 to the control input 26.1 of the shut-off valve 26. Subsequently, in a third step St1.3, the shut-off valve 26 is switched over in a manner dependent on the control pressure pS prevailing at the control input 26.1 if the control pressure pS is higher than the closing pressure pO. Here, the closing pressure pO may be selected such that the additional valve 24, which in the open operating mode BMo prevents the shut-off valve 26 from opening already owing to the precompressed pressure medium L2, can be omitted. For this purpose, the closing pressure pO must be selected to be higher than a maximum attainable intermediate pressure p2*max* that is to be attained by means of the first compression stage 5. Furthermore, a minimum charge pressure pAmin of the charge pressure medium A must be taken into consideration, such that, in the open operating mode BMo, an unintended closing of the shut-off valve 26, and in the closed operating mode BMc, a guaranteed closing of the shut-off valve 26, and thus a power reduction, can be ensured.

In a fourth step St1.4, the closing of the shut-off valve 26 prevents the intake air L1—preferably entirely—from entering the first compression stage 5. Thus, the first compression stage 5 conveys no or only a small portion of precompressed pressure medium L2 into the intermediate volume 13, and thus the compression power of the first compression stage 5 is limited, by virtue of the intermediate pressure p2 being restricted to the limit pressure pG and/or the intermediate volume flow Q2 being restricted to the limit volume flow QG. If a complete shutdown of the first compression stage 5 is desired, then no precompressed pressure medium L2 passes from the first compression stage 5 into the intermediate volume 13, and the power consumption of the first compression stage 5 is limited to friction losses and pressure medium remaining in the first compression stage 5, and therefore pG and Q2 are approximately zero. This energy gain may be used for optimal setting of the second compression stage 6.

The limitation of the compression power in the fourth step St1.4 may in this case for example also be implemented in a manner dependent on an upper energy limit oE, such that, in the event of the upper energy limit oE being exceeded, a greater portion of the intake air L1 is reduced, such that the power consumption of the first compression stage 5 and therefore also the energy consumption of the compressor 4 decrease.

In open operating mode BMo, the intake air L1 from the atmosphere 100 reaches the first compression stage 5 in a step St2.1. In the first compression stage 5, the intake air L1 is precompressed to the intermediate pressure p2 in a second step St2.2, and introduced into the intermediate volume 13 in a third step St2.3. From the intermediate volume 13, the precompressed pressure medium L2 reaches the second compression stage 6, where it is compressed again in a fourth step St2.4 to the final pressure p3. In a final step St2.5, the compressed pressure medium L3 reaches the pressure medium chambers 3.*i* or the pressure medium reservoir 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Pneumatic suspension system
3.$i$ Pressure medium chambers
4 Two-stage compressor
5 First compression stage
5.1 First intake space
5.2 First compression space
6 Second compression stage
6.1 Second intake space
6.2 Second compression space
7 Motor
8 First piston of first compression stage
9 Second piston of second compression stage
10 Intake line
11 First inlet valve
12 First outlet valve
13 Intermediate volume
14 Second inlet valve
15 Second outlet valve
16 Outlet line
17 Air dryer
18 Nozzle
19 Reservoir line
20 Pressure medium reservoir
21.$i$ Controllable valves
22$a$ First changeover valve
22$b$ Second changeover valve
23 Storage line
24 Additional valve
26 Shut-off valve (directional control valve)
26.1 Control input
26.2 Control line
27 Spring
28 Compressor cover
29 Compressor housing
30 Pressure meter
31 Outlet valve
100 Atmosphere
126 Shut-off valve (proportional valve)
200 Vehicle
A Charge pressure medium
BMo Open operating mode
BMc Closed operating mode
L1 Intake air
L2 Precompressed air
L3 Compressed air
L4 Stored air
L5 Chamber air
L6 Mixed air
oE Upper energy limit
NW Nominal width
pA Charge pressure
pAmin Minimum charge pressure
p1 Air pressure/intake pressure
p2 Intermediate pressure
p2$max$ Maximum intermediate pressure
p3 Final pressure
p4 Reservoir pressure
p6 Mixed pressure
pG Limit pressure
pO Closing pressure
pS Control pressure
VQ Valve cross section
Q1 Intake volume flow
Q2 Intermediate volume flow
QE Final volume flow
QG Limit volume flow
QS Storage volume flow
QM Mixed volume flow
St1.1, St1.2, St1.3, St1.4 Steps of method in BMc
St2.1, St2.2, St2.3, St2.4, St2.5 Steps of method in BMo

The invention claimed is:

1. A method for operating a pressure control system having a multistage compressor, the method comprising:
providing, by the multistage compressor, a pressure medium that has been compressed multiple times in order to fill a pressure medium reservoir or pressure medium chambers of the pressure control system, the providing the pressure medium including:
providing, by a first compression stage, a precompressed pressure medium and additionally compressing, via a second compression stage, the precompressed pressure medium, and/or
introducing an already compressed charge pressure medium into an intermediate volume between the first compression stage and the second compression stage of the multistage compressor, and further compressing, by the second compression stage, the charge pressure medium,
wherein the charge pressure medium simultaneously passes, via a control line, to a control input of a shut-off valve that interacts with the first compression stage, such that a charge pressure of the charge pressure medium predefines a control pressure of the shut-off valve,
wherein, by the shut-off valve, a pressure limitation and/or volume flow limitation, dependent on the control pressure, of the precompressed pressure medium conveyed by the first compression stage into the intermediate volume is set for the purposes of automatically adapting a compression power of the first compression stage by the charge pressure medium present in the control line.

2. The method as claimed in claim 1, wherein, by the shut-off valve, at least a portion of a pressure medium which is supplied to the first compression stage and is to be precompressed is reduced in order to generate the pressure limitation and/or the volume flow limitation of the precompressed pressure medium conveyed by the first compression stage.

3. The method as claimed in claim 2, wherein the portion of the pressure medium which is supplied to the first compression stage and is to be precompressed is set in a continuously variable fashion in dependence on the control pressure.

4. The method as claimed in claim 2, wherein, in the case of a partial supply of to-be-precompressed pressure medium, a pressure-limited and/or volume-flow-limited precompressed pressure medium passes out of the first compression stage and into the intermediate volume, and thus the multistage compressor provides a pressure medium compressed by the second compression stage, which pressure medium is obtained both from a compression of the charge pressure medium and from a compression of the pressure-limited and/or volume-flow-limited precompressed pressure medium from the first compression stage.

5. The method as claimed in claim 4, wherein the portion of the to-be-precompressed pressure medium supplied to the first compression stage is set in dependence on an upper energy limit of the multistage compressor, wherein, in the event of the upper energy limit being exceeded, the portion of the to-be-precompressed pressure medium supplied to the first compression stage is reduced.

6. The method as claimed in claim 1, wherein the shut-off valve is either fully open or fully closed in dependence on the control pressure.

7. The method as claimed in claim 6, wherein, when the shut-off valve is fully closed, a supply of to-be-precompressed pressure medium into the first compression stage is prevented so that almost no precompressed pressure medium passes from the first compression stage into the intermediate volume, wherein the first compression stage is thus pneumatically shut down, and the multistage compressor thus provides a multiply compressed pressure medium which is obtained from a compression of the charge pressure medium in the second compression stage, in order to reduce the energy consumption of the compressor.

8. The method as claimed in claim 1, wherein the charge pressure medium is admitted into a storage line by opening of a controllable switching valve, wherein the charge pressure medium, in the event of the switching valve being opened, is conducted both into the intermediate volume and to the control input of the shut-off valve.

9. A pressure control system, comprising:
a multistage compressor with a first compression stage configured to provide a precompressed pressure medium and a second compression stage configured to provide a compressed pressure medium, wherein the first compression stage and the second compression stage are connected via an intermediate volume configured to convey the precompressed pressure medium into the second compression stage,
at least one pressure medium chamber connected to the second compression stage,
a pressure medium reservoir connected to the second compression stage and configured to store the compressed pressure medium,
a storage line connecting the pressure medium reservoir or the at least one pressure medium chamber to the intermediate volume for operation of the pressure control system with pressure medium stored in the pressure medium reservoir or for return of a chamber pressure medium used in the pressure medium chambers to the pressure medium reservoir, and
a shut-off valve configured to interact with the first compression stage such that, in dependence on an actuation of the shut-off valve, a pressure limitation and/or a volume flow limitation of the precompressed pressure medium conveyed by the first compression stage into the intermediate volume can be achieved for the purposes of adapting a compression power of the first compression stage,
wherein a control line to a pneumatic control input of the shut-off valve branches off from the storage line such that the stored pressure medium or the chamber pressure medium can be fed as charge pressure medium to the intermediate volume and simultaneously via the control line to a control input of the shut-off valve as control pressure for the purposes of self-regulating pneumatic actuation of the shut-off valve by means of the charge pressure medium situated in the control line, and
wherein, a shut-off function is provided which prevents the pressure medium precompressed by the first compression stage from switching, via the intermediate volume and the control line, the shut-off valve for the pressure limitation and/or the volume flow limitation.

10. The pressure control system as claimed in claim 9, wherein the shut-off valve is arranged such that a portion of a pressure medium that is supplied to the first compression stage and is to be precompressed can, in a manner dependent on the control pressure, be set for the purposes of pressure limitation and/or volume flow limitation of the precompressed pressure medium conveyed by the first compression stage into the intermediate volume.

11. The pressure control system as claimed in claim 10, wherein the shut-off valve is arranged in an intake line leading to the first compression stage such that the portion of the pressure medium flowing through the intake line to the first compression stage can be set by the position of the shut-off valve.

12. The pressure control system as claimed in claim 9, wherein the shut-off function is ensured by an overpressure valve arranged between the intermediate volume and the shut-off valve.

13. The pressure control system as claimed in claim 9, wherein the shut-off function is formed by a closing pressure of the shut-off valve, wherein the closing pressure indicates the pressure above which the shut-off valve moves into an at least partially closed position,
wherein the closing pressure is higher than a maximum intermediate pressure of the pressure medium precompressed by the first compression stage and lower than or equal to a minimum charge pressure of the charge pressure medium, and
wherein the maximum intermediate pressure and the minimum charge pressure are coordinated with one another through a corresponding configuration of the multistage compressor.

14. The pressure control system as claimed in claim 9, wherein a first controllable changeover valve is provided in the storage line for releasing the stored pressure medium as a charge pressure medium, and a second controllable changeover valve for releasing the chamber pressure medium as a charge pressure medium, wherein the released charge pressure medium reaches the intermediate volume and the control input of the shut-off valve from the storage line.

15. The pressure control system as claimed in claim 14, wherein a nominal width of each the changeover valves lies between 1 mm and 4 mm, in order to increase a storage volume flow in the intermediate volume and a final volume flow from the second compression stage.

16. The pressure control system as claimed in claim 9, wherein the shut-off valve is designed as a pneumatic directional control valve with a spring for the purposes of stepwise pressure limitation and/or volume flow limitation of the precompressed pressure medium.

17. The pressure control system as claimed in claim 9, wherein the shut-off valve is designed as a pneumatic proportional valve for the purposes of continuously variable pressure limitation and/or volume flow limitation of the precompressed pressure medium.

18. The pressure control system as claimed in claim 9, wherein the shut-off valve and components of the shut-off function are integrated in a compressor housing of the multistage compressor.

19. The pressure control system as claimed in claim 9, wherein the pressure control system is a pneumatic suspension system in a vehicle.

20. A vehicle, with a pressure control system as claimed in claim 9.

* * * * *